United States Patent
Tseng

(10) Patent No.: US 9,430,747 B2
(45) Date of Patent: Aug. 30, 2016

(54) ELECTRONIC DEVICE AND METHOD OF ADJUSTING EXECUTION STATE OF ELECTRONIC DEVICE

(71) Applicant: PEGATRON CORPORATION, Taipei (TW)

(72) Inventor: Yu-Hung Tseng, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 208 days.

(21) Appl. No.: 14/490,070

(22) Filed: Sep. 18, 2014

(65) Prior Publication Data

US 2015/0100775 A1 Apr. 9, 2015

(30) Foreign Application Priority Data

Oct. 9, 2013 (TW) ............................. 102136636 A

(51) Int. Cl.
| | |
|---|---|
| G06Q 10/06 | (2012.01) |
| G06F 9/44 | (2006.01) |
| G06F 1/32 | (2006.01) |
| G06F 9/445 | (2006.01) |
| G06Q 50/26 | (2012.01) |

(52) U.S. Cl.
CPC ............. *G06Q 10/06* (2013.01); *G06F 1/3206* (2013.01); *G06F 9/44505* (2013.01); *G06Q 50/26* (2013.01)

(58) Field of Classification Search
CPC .. G06Q 10/06; G06F 9/44505; G06F 1/3206
See application file for complete search history.

(56) References Cited

U.S. PATENT DOCUMENTS

| | | | | |
|---|---|---|---|---|
| 6,082,623 | A  * | 7/2000 | Chang | G06F 1/203 165/80.3 |
| 6,988,211 | B2 * | 1/2006 | Cline | G06F 1/3203 711/100 |
| 8,023,842 | B2 * | 9/2011 | Motoyama | G03G 15/5004 399/37 |
| 9,130,684 | B2 * | 9/2015 | Langille | H04H 20/42 |

FOREIGN PATENT DOCUMENTS

| | | |
|---|---|---|
| CN | 101064882 A | 10/2007 |
| CN | 103038765 A | 4/2013 |
| TW | I312470 B | 7/2009 |
| TW | 201316164 A1 | 4/2013 |

* cited by examiner

*Primary Examiner* — Stefan Stoynov
(74) *Attorney, Agent, or Firm* — Muncy, Geissler, Olds & Lowe, P.C.

(57) ABSTRACT

An electronic device comprises a detecting unit and a processing unit, comprising. The method of adjusting execution state of electronic device comprises: a current environmental condition is detected through the detecting unit to generate a current environmental signal and the current environmental signal is transmitted to the processing unit. A current execution state of the electronic device is read through the processing unit. A step of comparing with a state look-up table of the electronic device is performed to allow the current environmental signal to correspond to a predetermined environmental condition in the state look-up table of the electronic device. It determines whether the current execution state of the electronic device conforms to a predetermined execution state of the predetermined environmental condition. If not, the current execution state of the electronic device is adjusted to allow the current execution state to be the same with the predetermined execution state.

13 Claims, 2 Drawing Sheets

ELECTRONIC DEVICE AND METHOD OF ADJUSTING EXECUTION STATE OF ELECTRONIC DEVICE

CROSS REFERENCE TO RELATED APPLICATIONS

This application claims the priority benefits of Taiwan Patent Application No. 102136636, filed on Oct. 9, 2013. The entirety of the above-mentioned patent applications are hereby incorporated by references herein and made a part of specification.

BACKGROUND

1. Technology Field

This disclosure relates to an electronic device and a method of adjusting execution state of electronic device.

2. Description of the Related Art

As the development of information technology and the popularization of Internet, electronic devices have been necessary for the usually life. Moreover, the electronic device can be further adjusted to different execution states according to different environments. For example, a conference mode can be used during the conference and a mute mode can be used during working period. However, the commercial electronic device cannot determine the environment by itself for automatically adjusting.

For example, a user needs to adjust the execution state of the electronic device manually after determining by himself/herself or the user can adjust the electronic device to a specific execution state at a specific period via presetting. For example, we can set the mute mode from 8 pm to 6 am at the next day. However, it is inconvenient that the user need to set up first or change on time. Furthermore, if the setting parameters, such as time and time zone, in the electronic device are changed, the correct operation needs to rely on the new adjustment from the user or changing the setting.

For this reason, how to offer a method automatically adjusting the execution state of the electronic device depending on the environment condition will be one of the urgent questions that may need to be solved.

BRIEF SUMMARY

According to the abovementioned tasks, an aspect of the present invention is to provide a method of automatically adjusting execution states of an electronic device according to environmental conditions.

To achieve the abovementioned aspect, the present invention relates to a method of adjusting execution state of electronic device for an electronic device. The electronic device has execution states and comprises a detecting unit and a processing unit.

The method comprises: a current environmental condition is detected through the detecting unit to generate a current environmental signal and the current environmental signal is transmitted to the processing unit. A current execution state of the electronic device is then read through the processing unit.

A step of comparing with a state look-up table of the electronic device is performed to allow the current environmental signal to correspond to a predetermined environmental condition in the state look-up table of the electronic device. It determines whether the current execution state of the electronic device conforms to a predetermined execution state corresponding to the predetermined environmental condition in the state look-up table of the electronic device, in which the state look-up table of the electronic device records the predetermined execution state of the electronic device or at least an electronic device around the electronic device under the predetermined environmental condition.

If not, the processing unit adjusts the current execution state of the electronic device to allow the current execution state to be the same with the predetermined execution state.

In an embodiment of the present invention, before detecting the current environmental condition through the detecting unit to generate the current environmental signal and transmitting the current environmental signal to the processing unit, the method further comprises a step of setting up the state look-up table of the electronic device.

In an embodiment of the present invention, the environmental condition is time information or positional information.

In an embodiment of the present invention, the electronic device further comprises a storage unit and the state look-up table of the electronic device is stored in the storage unit.

In an embodiment of the present invention, the state look-up table of the electronic device is stored in a server and the server is electrically or wirelessly connected with the electronic device.

In an embodiment of the present invention, the predetermined execution state is statistical data.

In an embodiment of the present invention, the electronic device is a display device, a playback device, a desktop computer or a mobile communication device.

The present invention further provides an electronic device comprising a processing unit, a storage unit, a detecting unit and an execution program. The execution program is stored in the storage unit and can be executed by the processing unit.

The execution program at least executes following steps: a current environmental condition is detected through the detecting unit to generate a current environmental signal and the current environmental signal is transmitted to the processing unit. A current execution state of the electronic device is then read through the processing unit.

A step of comparing with a state look-up table of the electronic device is performed to allow the current environmental condition to correspond to a predetermined environmental condition in the state look-up table of the electronic device. It determines whether the current execution state of the electronic device conforms to a predetermined execution state corresponding to the predetermined environmental condition in the state look-up table of the electronic device, in which the state look-up table of the electronic device records the predetermined execution state of the electronic device or at least an electronic device around the electronic device under the predetermined environmental condition.

If not, the processing unit adjusts the current execution state of the electronic device to allow the current execution state to be the same with the predetermined execution state.

In an embodiment of the present invention, before detecting the current environmental condition through the detecting unit to generate the current environmental signal and transmitting the current environmental signal to the processing unit, the method further comprises a step of setting up the state look-up table of the electronic device.

In an embodiment of the present invention, the environmental condition is time information or positional information.

In an embodiment of the present invention, the state look-up table of the electronic device is stored in the storage unit.

In an embodiment of the present invention, the state look-up table of the electronic device is stored in a server and the server is electrically or wirelessly connected with the electronic device.

In an embodiment of the present invention, the predetermined execution state is statistical data.

DETAILED DESCRIPTION

An electronic device and a method for adjusting execution state of electronic device according to a preferred embodiment of the present invention will be described in the following and cooperated with related figures, in which the same elements and steps will be indicated by the same number. Furthermore, the elements, which do not directly related to the present invention, are omitted for easily understanding.

First, the electronic device described in the present specification can be a display device, a playback device, a tablet, a desktop computer or a mobile communication device. The electronic device is capable of having more or less assemblies than the embodiment, combining two or more assemblies, or having a different configuration of the assemblies. In addition, the processing unit described in the present specification can be all kinds of useable processing units, dual micro-processing units and other multi micro-processing unit. Furthermore, the storage unit described in the present specification can be a memory including a high-speed random access memory and also can be a non-volatile memory, such as one or more disk storage devices, flash memories or other non volatile solid state memories.

Figure 1:
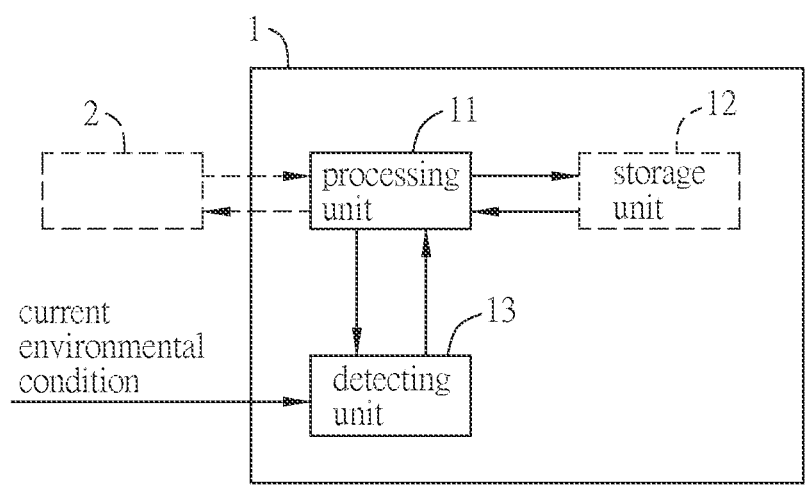
FIG. 1 is a structure drawing showing an electronic device according to an embodiment of the present invention.
Figure 2:
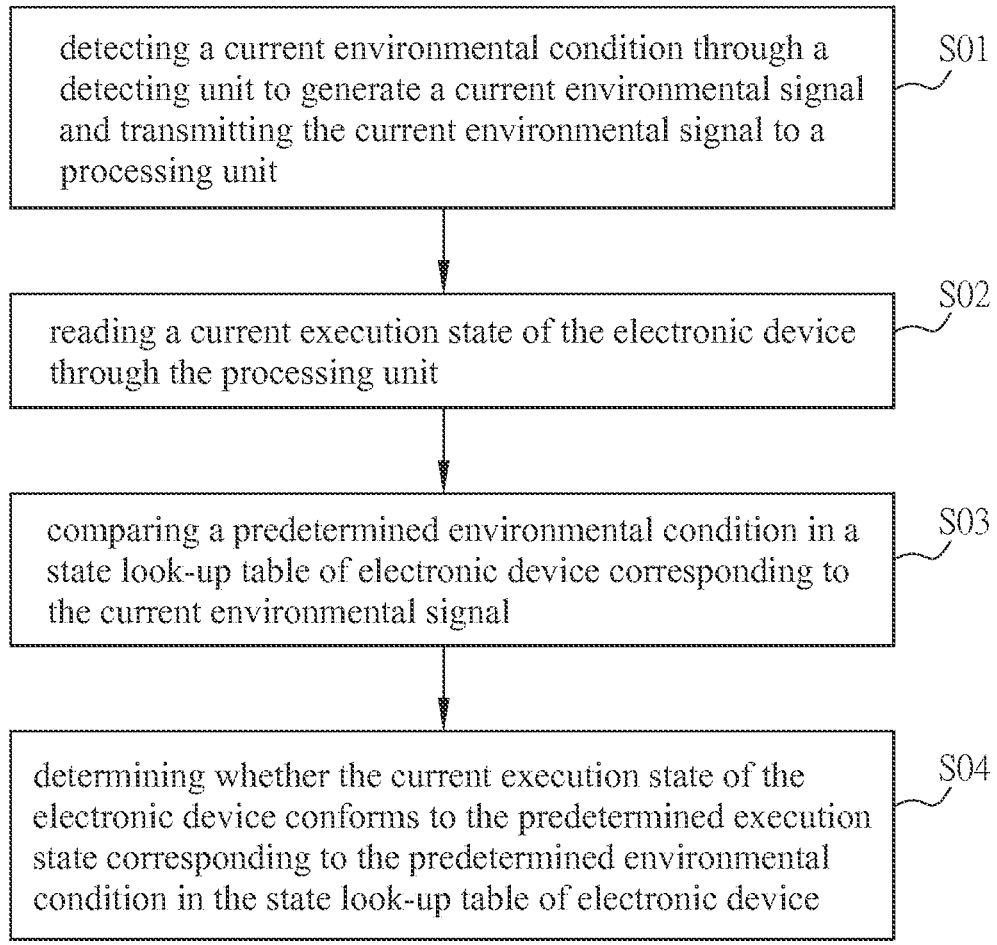
FIG. 2 is a flowchart showing a method of adjusting execution state of electronic device according to an embodiment of the present invention.

Please refer to FIG. 1 in conjunction with FIG. 2. FIG. 1 is a structure drawing showing an electronic device according to an embodiment of the present invention, and FIG. 2 is a flowchart showing a method of adjusting execution state of electronic device according to an embodiment of the present invention. Illustratively, unnecessary elements of the embodiment of the present invention are indicated by dotted lines.

A method for adjusting execution state of electronic device provided in the embodiment of the present invention can be applied on an electronic device 1, and the electronic device 1 has execution states.

The electronic device 1 comprises a processing unit 11 and a detecting unit 13. The electronic device 1 further comprises a storage unit 12, and the processing unit 11, the storage unit 12 and the detecting unit 13 are electrically connected with each other directly or indirectly or are coupled to a chip.

In addition, the electronic device 1 of the present invention further comprises at least an execution program. The execution program can be stored in the storage unit 12 and executed by the processing unit 11. Each of application programs is capable of executing the following one step or more.

The steps of the method according to an embodiment of the present invention will be described in details as the following.

First, a current environmental condition is detected through the detecting unit 13 to generate a current environmental signal. And then, the current environmental signal is transmitted to the processing unit 11 (step S01). The processing unit 11 reads a current execution state of the electronic device 1 (step S02). Briefly, two parameters, i.e. the current environmental signal of the electronic device 1 and the current execution state under such the current environmental signal are obtained through the detecting unit 13 and the processing unit 11, respectively.

Accordingly, a comparison with a state look-up table of the electronic device will be started after obtaining the two parameters. Comparing with the state look-up table of the electronic device allows the current environmental signal to correspond to a predetermined environmental condition in the state look-up table of the electronic device (step S03).

The description is resupplied that the state look-up table of the electronic device is capable of applying for recording a predetermined execution state of the electronic device or at least an electronic device around the electronic device under a predetermined environmental condition.

Furthermore, the predetermined execution state described here can be statistical data. For example, the current execution states of the electronic device 1 or at least an electronic device around the electronic device during a period are recorded and then calculated to obtain a predetermined execution program within the period. The environmental condition is time information or positional information. The positional information can be such as a positioning coordinate or a nearby landmark, and the time information can be such as the system time of the electronic device 1.

The state look-up table of the electronic device can be stored in the storage unit 12, a server 2 or both. The server 2 is electrically or wirelessly connected with the electronic device 1.

If the state look-up table of the electronic device is built in the storage unit 12, the electronic device 1 is capable of comparing the current environmental signal with the predetermined environmental condition of the state look-up table of the electronic device directly.

If the state look-up table of the electronic device is stored in the server 2, the electronic device 1 will download the state look-up table of the electronic device from the server 2 and store it in the storage unit 12. Therefore, it only needs to download the state look-up table of the electronic device from the server 2 periodically. Or, the electronic device 1 can read the state look-up table of the electronic device of the server 2 through an electrical or a wireless transmission to allow the electronic device 1 to compare the current environmental signal with the predetermined environmental condition of the state look-up table of the electronic device. The similar effect can also be achieved.

One of methods for setting up the state look-up table of the electronic device is to dispose a user input recording unit for recording how a user uses the electronic device 1.

The user input recording unit is capable of recording the relation between the execution state of the electronic device and the environmental condition. The execution state can be a normal ring mode, a conference mode or a vibration mode, but the present invention is not limited to these modes.

For example, the electronic device 1 (such as a mobile phone) will be adjusted to the vibration mode when the user enters a cinema. At this time, the user input recording unit will record the environment condition of the electronic device 1 (the environmental condition is the positional information and the cinema is recorded) and the corresponding execution state (the vibration mode) of the electronic device 1. And then, the relation will be stored in the state look-up table of the electronic device.

Alternately, if the user does not operate the electronic device 1 from 8 pm to 6 am next day constantly, the user input recording unit records that the environmental condition of the electronic device 1, which is the time information (from 8 pm to 6 am next day), and the corresponding execution state of the electronic device 1 (non-operation status). At this time, the corresponding execution state of the electronic device 1 will be determined to be an execution state capable of being adjusted to a save mode.

In addition, the term "statistical data" used herein is not limited to the statistical data of the electronic device 1 itself. The state look-up table of the electronic device can be integrated from the statistical data of the electronic device and the electronic device 1 having a similar configuration.

In addition, the state look-up table of the electronic device will store similar, adjacent environmental conditions to a set. For example, positioning coordinates or landmarks having 100 kilometers of distance radius can be set as a set of an environmental condition. When the environmental condition of the electronic device 1 conforms to any of positioning coordinates or landmarks within the abovementioned environmental condition, it will be determined to be equal or conformable.

Furthermore, the step of determining whether the state look-up table of the electronic device is conformed or not can be performed by setting up a logic condition to compare the current environmental signal with a plurality of predetermined environmental conditions one by one. When the current environmental signal is found to be the same as the predetermined environmental condition, the comparison of the logic condition is finished. And then, the step of determining whether the current execution state conforms to the predetermined execution state, which conforms to the predetermined environmental condition, or not.

And then, it determines whether the current execution state of the electronic device 1 conforms to the predetermined execution state corresponding to the predetermined environmental condition in the state look-up table of the electronic device (step S04). If not, the processing unit 11 adjusts the current execution state of the electronic device by the processing unit to allow the current execution state to be the same with the predetermined execution state.

Briefly, the predetermined execution state of the electronic device 1 corresponding to the predetermined environmental condition can be obtained by reading the corresponding predetermined environmental condition in the state look-up table. Comparing the predetermined execution state of the state look-up table of the electronic device with the current execution state of the electronic device 1 will realize whether the abovementioned two conform to each other or not. If yes, there is no further action. If not, the current execution state of the electronic device 1 is adjusted to the predetermined execution state, which conforms to the state look-up table of the electronic device.

Therefore, this method can improve the disadvantage that the user needs to manually adjust the execution state of the electronic device. The execution state can be corrected not only according to the past statistical data of the electronic device 1 but also through at least an electronic device around the electronic device 1.

In addition, before step S01 of the present embodiment, there is a further step of setting up the state look-up table of the electronic device.

In the embodiment of the present invention, a step can further performed to adjust various execution programs of the electronic device 1 when the electronic device 1 is under a sleep mode. For example, a cycle of the update or the response of the execution program within the electronic device 1 can be extended or adjusted to an uniform cycle during the sleep mode for saving power. Furthermore, a program whitelist can be preset to prevent the programs listed in the whitelist from adjusting so as to result in unstable system.

The description is resupplied that the present invention can further utilize a dedicated assembly and/or a programmable processing unit and/or any combination of other programmable devices to achieve an embodiment of the present invention. Although the abovementioned embodiment aims at a specific hardware (electronic device) and software, persons having ordinary skill in the art may utilize various combinations of the hardware and/or software to perform the abovementioned step of the present invention.

In addition, the computer program comprising each feature of the present invention can also be encoded on all kinds of non-transitory computer-readable mediums that are used for storing and/or transmitting. And then, appropriate mediums at least comprise a disk or a tape, an optical storage media such as CD or DVD (digital video disk), flash memory or the likes. A computer-readable media encoded with a code can be packed with a compatible device or provided apart from other devices (for example, it can be downloaded from Internet). However, the present invention is not limited thereto.

To sum up, a method for automatically adjusting the execution state of the electronic device according to the environmental condition can be provided by setting up the state look-up table of the electronic device and comparing the current environmental signal and the current execution state of the electronic device with the state look-up table of the electronic device.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method of adjusting execution state of electronic device for an electronic device, wherein the electronic device comprises a detecting unit and a processing unit, comprising:

detecting a current environmental condition through the detecting unit to generate a current environmental signal and transmitting the current environmental signal to the processing unit;

reading a current execution state of the electronic device through the processing unit;

comparing with a state look-up table of the electronic device to allow the current environmental signal to correspond to a predetermined environmental condition in the state look-up table of the electronic device;

determining whether the current execution state of the electronic device conforms to a predetermined execution state corresponding to the predetermined environmental condition in the state look-up table of the electronic device, wherein the state look-up table of the electronic device records the predetermined execution state of the electronic device or at least an electronic device around the electronic device under the predetermined environmental condition; and if not, adjusting the current execution state of the electronic device by the processing unit to allow the current execution state to be the same with the predetermined execution state.

2. The method according to claim 1, before detecting the current environmental condition through the detecting unit to generate the current environmental signal and transmitting the current environmental signal to the processing unit, further comprising:

setting up the state look-up table of the electronic device.

3. The method according to claim 1, wherein the environmental condition is time information or positional information.

4. The method according to claim 1, wherein the electronic device further comprises a storage unit and the state look-up table of the electronic device is stored in the storage unit.

5. The method according to claim 1, wherein the predetermined execution state is statistical data.

6. The method according to claim 1, wherein the state look-up table of the electronic device is stored in a server and the server is electrically or wirelessly connected with the electronic device.

7. The method according to claim 1, wherein the electronic device is a display device, a playback device, a desktop computer or a mobile communication device.

8. An electronic device, comprising:
a processing unit;
a storage unit;
a detecting unit; and
an execution program stored in the storage unit and capable of being executed by the processing unit, wherein the execution program at least executes following steps:

detecting a current environmental condition through the detecting unit to generate a current environmental signal and transmitting the current environmental signal to the processing unit;

reading a current execution state of the electronic device through the processing unit;

comparing with a state look-up table of the electronic device to allow the current environmental signal to correspond to a predetermined environmental condition in the state look-up table of the electronic device;

determining whether the current execution state of the electronic device conforms to a predetermined execution state corresponding to the predetermined environmental condition in the state look-up table of the electronic device, wherein the state look-up table of the electronic device records the predetermined execution state of the electronic device or at least an electronic device around the electronic device under the predetermined environmental condition; and if not, adjusting the current execution state of the electronic device by the processing unit to allow the current execution state to be the same with the predetermined execution state.

9. The electronic device according to claim 8, before detecting the current environmental condition through the detecting unit to generate the current environmental signal and transmitting the current environmental signal to the processing unit, further comprising:

setting up the state look-up table of the electronic device.

10. The electronic device according to claim 8, wherein the environmental condition is time information or positional information.

11. The electronic device according to claim 8, wherein the state look-up table of the electronic device is stored in the storage unit.

12. The electronic device according to claim 8, wherein the state look-up table of the electronic device is stored in a server and the server is electrically or wirelessly connected with the electronic device.

13. The electronic device according to claim 8, wherein the predetermined execution state is statistical data.

* * * * *